United States Patent [19]

Maranto

[11] Patent Number: 4,588,257
[45] Date of Patent: May 13, 1986

[54] SEPARABLE SPLICE FOR OPTIC FIBERS

[75] Inventor: Jack J. Maranto, Capistrano Beach, Calif.

[73] Assignee: Hughes Aircraft Company, Culver City, Calif.

[21] Appl. No.: 544,768

[22] Filed: Oct. 24, 1983

[51] Int. Cl.⁴ .............................................. G02B 7/26
[52] U.S. Cl. ................................................. 350/96.21
[58] Field of Search ................ 350/96.20, 96.21, 96.22

[56] References Cited

U.S. PATENT DOCUMENTS

| 4,140,365 | 2/1979 | Burger et al. | 350/96.20 |
| 4,274,708 | 6/1981 | Cocito et al. | 350/96.21 |
| 4,432,602 | 2/1984 | Margolin | 350/96.20 |
| 4,460,820 | 7/1984 | Matsumoto et al. | 350/96.21 X |

FOREIGN PATENT DOCUMENTS 53-28440  3/1978  Japan ................................. 350/96.21

Primary Examiner—John Lee
Attorney, Agent, or Firm—Joseph E. Szabo; Anthony W. Karambelas

[57] ABSTRACT

A pair of fiber optic termini is held securely in axially-aligned engagement by snapping it into the bifurcated arms of a U-shaped spring clip from which it can be readily removed for rapid disconnection.

7 Claims, 2 Drawing Figures

SEPARABLE SPLICE FOR OPTIC FIBERS

BACKGROUND OF THE INVENTION

1. Field of the Invention

The subject invention relates generally to the interconnection of optic fibers and more particularly to the separable splicing of an optic fiber by means of a pair of termini and the mounting of those termini.

2. Description of the Prior Art

Optic fibers have come to be recognized as an alternative to metal wires for carrying information in the form of light rather than electricity. Where a bundle of wires needs to be made detachable or separable at a given point, a connector is provided having two halves with a plurality of matable termini terminating the wires so that when the connector is assembled, the termini are engaged and electrical continuity through the wires is established. Similar connectors exist for optic fibers, whether single or bundled. Such connectors tend to be of substantial size and weight because of the environmental demands and requirements of strength placed upon them. Thus, when two portions of a fiber optic cable are engaged through a connector, the latter must be designed to secure the cable portions to the connector and to protect the pins against the environment. As a result such connectors tend to be quite substantial. There are situations, however, where the need to establish a connection between portions of an optic fiber does not create such stringent demands. Such, for example, is the case where it is merely desired to provide an easily separable connection, or splice, in one or more optic fibers inside an enclosure housing electronic equipment. In such circumstances, strain relief and protection against the environment can be otherwise provided, protection against stress being provided by clamps and protection against the environment being furnished by the enclosure itself. In such circumstances, a conventional connector would be larger, heavier, more costly and more difficult to use than necessary.

It is, therefore, a principal object of the present invention to provide a secure, light, compact, easily-separable and inexpensive splice for one or more optic fibers.

A related object of the invention is to provide a compact and inexpensive device whereby one or more optic fibers may be securely spliced and held accessible for rapid disconnection.

SUMMARY OF THE INVENTION

These and other objects of the invention are achieved by a device wherein a separable splice is provided in an optic fiber by terminating two segments of an optic fiber in a pair of pin-shaped termini provided with means for keeping the termini engaged in axial alignment, each terminus also having a shoulder transverse to its axis. The termini are mounted in a U-shaped spring clip having a pair of resilient arms extending from opposite ends of a central spine, each arm terminating in a pair of fingers. The shoulders of the terminus pair are spaced slightly farther apart than are the fingers of the respective spring clip arms so that, when the terminus pair is snapped in place therein, between the fingers of the arms, the arms are forced apart by the axially-aligned pair of pins, thereby causing the spring clip to bias the pins toward each other to insure transmission of light between them. Mounting holes may be added to the spine portion to facilitate mounting the fiber optic termini by means of the clip inside an enclosure housing electronic equipment.

Several splices may be accommodated in a minimum space by a multi-clip bracket having several pairs of mutually aligned arms extending from opposite edges of a common spine for receiving a set of axially aligned terminus pairs, each pair serving as the splice for one optic fiber. By providing score lines which extend across the spine, a bracket can be readily adapted to accommodate a number of terminus pairs by breaking it along one of its score lines.

DETAILED DESCRIPTION OF THE INVENTION

Figure 1:
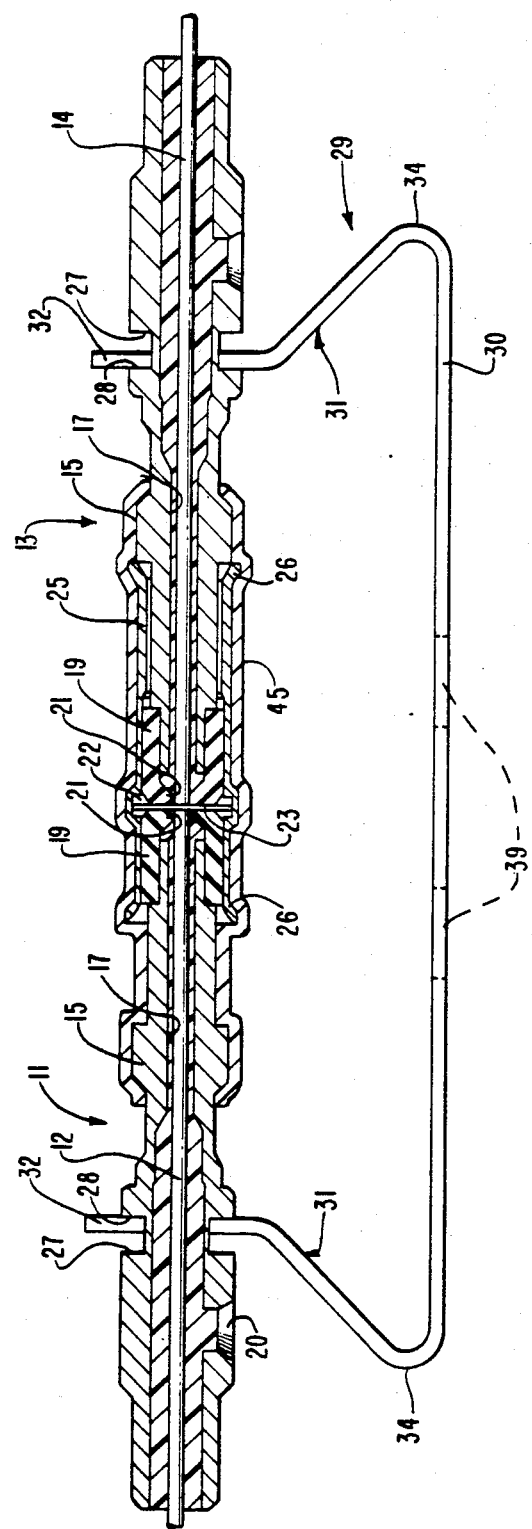
FIG. 1 is a cross-section through a pair of fiber optic termini held together by a U-shaped spring clip in accordance with the present invention.
Figure 2:
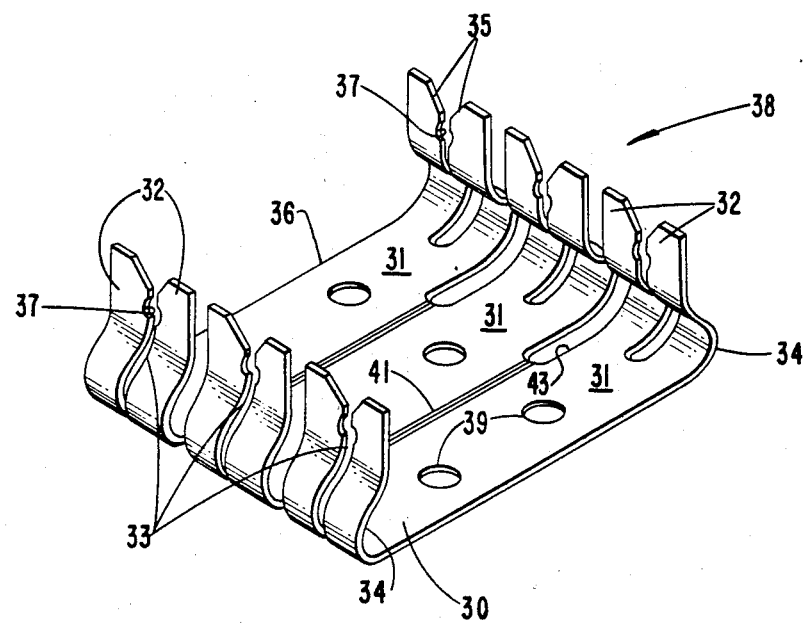
FIG. 2 is a perspective view of a mounting bracket incorporating the present invention and adapted to retain a plurality of pairs of fiber optic termini.

A fiber optic splice constructed in accordance with the present invention is illustrated in FIGS. 1 and 2. It includes a pair of pin-shaped termini 11 and 13, each for terminating one of a pair of optic fibers 12 and 14. Such termini are widely available in different designs, one of them being that which is illustrated, a design similar to that disclosed and claimed in a patent application entitled "Optical Fiber Wave Guide Connector System" by Norbert L. Moulin, filed Aug. 9, 1979, and assigned to the assignee of the present application. As described more completely in the referenced patent application, each terminus includes a cylindrical housing 15 penetrated by an axial through-bore 17. Each terminus housing 15 terminates in an alignment bushing 19 having a precision hole 21 through its tip, the hole 21 being dimensioned precisely to match the diameter of one of the optic fibers 12 and 14, each of which is threaded through one of the through-bores 17 until it emerges through its associated bushing hole 21. Through an opening 20 an epoxy is injected into the interior of each housing 15 so as to securely fix the optic fiber 12 or 14 therein, after which each of the fibers 12 and 14 is made to terminate flush with the end of its associated alignment bushing 19 by a grinding operation.

The terminus housings 15 are held in axial alignment by an alignment sleeve 25 having flared ends into which the tips of the housings 15 are inserted. To prevent damage to the optic fibers 12 and 14, a spacer 23 is held between the ends 26 of the sleeve 25, within a circumferential groove 22 formed integrally with the alignment sleeve 25.

The termini 11 and 13 as just described have heretofore been used mainly in fiber optic connectors wherein each terminus is held within a terminus-retaining bore, means being provided in the interlocking portions of the fiber optic connector body, when engaged, to provide a spring bias urging the pins 11 and 13 toward one another. To provide environmental sealing, each of the terminus housings 15 is provided with a groove 27 wherein an O-ring may be retained to establish a seal between the terminus body and the connector housing bore wherein the terminus body is retained. As will appear shortly, advantage is taken in implementing the present invention of one of the shoulders 28 of the grooves 27.

In accordance with the present invention, the pair of termini 11 and 13 which are quite small, inexpensive, and light in comparison to the connector housings in which they are normally retained, are used to effect a separable splice between the pair of optic fibers 12 and 14 with the aid of a single additional component, comparable in size and cost to the termini 11 and 13. This additional component is a U-shaped spring clip 29 having a flat spine from the opposite ends of which there extend a pair of arms 31, each terminating in a pair of fingers 32.

As best seen in FIG. 2, several such mounting clips 29 may be combined and formed from a single strip of metal, preferably beryllium copper. The strip 36 is articulated by means of cutouts 43 to define a plurality of pairs of opposing arms 31, each arm being bifurcated to terminate in a pair of fingers or prongs 32 separated by slots 33. In order to facilitate insertion of the axially-aligned terminus pair 11 and 13 into the respective mounting clips 29 in the manner shown in FIG. 1, the inside corners 35 of both fingers 32 are chamfered. Similarly, to aid in the retention of the terminus pair 11 and 13 in the mounting brackets 29 just below each pair of chamfered corners 35 are a pair of arcuate recesses 37 which together form a circular terminus positioning hole. It is apparent that the axially-aligned terminus pair 11 and 13 can be quickly snapped into and out of position in the mounting clip 29 simply by being pressed down into the bifurcated arms 31 until they snap into place in the circular positioning holes 37.

In order to insure optimum light transmission between the optic fibers 12 and 14, it is highly desirable that the optic fiber termini 11 and 13 be continually pressed against each other. This objective is readily attained by the mounting clip of the present invention by so dimensioning it that the distance between each pair of opposed fingers 32 is slightly smaller than that between the shoulders 28 of the assembled pins 11 and 13. By this means it is assured that, when the terminus pair 11 and 13 is snapped into place in the mounting clip 29, the arms 31 thereof will be spread apart, thereby providing a constant spring bias tending to urge the termini 11 and 13, one toward the other, thus maintaining the proper fiber-to-fiber interface. Optimum resiliency for the mounting clip 29, and particularly its arms 31 is provided by a transitional C-shaped region 34 between the flat spine 30 and each pair of fingers 32.

To further add to the invention's utility, a multiclip bracket 38 may be provided with a plurality of substantially parallel score lines 41 to permit forming a bracket containing just the right number of clips by breaking the bracket along one of the lines 41.

Each of the mounting clips 29 is provided with a pair of mounting holes 39 so that, regardless of whether the mounting bracket 38 includes one or more of the mounting clips 29, it may be securely mounted on the surface of an enclosure within which the fiber optic termini 11 and 13 are to be contained. The secure mounting of the bracket 38, particularly where it comprises only a single clip 29, is further enhanced by the spine 30 being flat along at least part of its length.

If additional environmental protection is desired, there is sufficient space to enclose each terminus pair along substantially its entire length between the clip arms that hold it in a short piece of shrink tubing 45 which can be easily slit, removed and replaced with another such piece when required for terminus maintenance.

From the foregoing it is apparent that there has been contributed to the art of fiber optic technology an approach for splicing optic fibers which is more flexible, less expensive, more compact, lighter and easier to use than the approach of the prior art, represented principally by relatively expensive and space-consuming fiber optic connectors. This has been attained by the use of commonly available and proven components in the form of optic fiber termini and the replacement of other portions of fiber optic connectors with a simple spring clip uniquely adapted to retain a pair of axially aligned fiber optic termini in a sheltered environment in which the spring clip is all that is needed to maintain the termini securely engaged and readily disengageable.

What is claimed is:

1. A separable splice for optic fibers comprising:
    (a) a U-shaped spring clip having a pair of resilient arms extending from opposite ends of a central spine, each arm terminating in a pair of fingers, the fingers of each arm having a gap between them, fingers of one arm being spaced apart from fingers of the other arm, and
    (b) a pair of pin-shaped fiber optic termini with means to maintain them engaged in axial alignment, even in the absence of said spring clip, each terminus having a shoulder transverse to its axis, said shoulders being spaced apart farther than the fingers of said arms, each terminus being inserted at its shoulder into the space between fingers of one of said arms so as to keep the arms of said clip flexed apart and said termini pressed toward each other.

2. The optic fiber splice of claim 1 characterized further in that each said arm is bifurcated to form a two-pronged fork, said prongs having interfacing chamfered corners and arcuate cutouts to facilitate the insertion and insure the retention of said termini within said arms.

3. The optic fiber splice of claim 1 characterized further by a length of shrink tubing installed to surround each said pair of termini along the majority of their length between said clip arms.

4. A U-shaped spring clip assembly for retaining a series of pin-shaped, axially aligned terminus pairs, with each terminus pair being substantially parallel to every other terminus pair, said assembly comprising:
    (a) a spine,
    (b) a plurality of bifurcated arms extending from opposite sides of said spine, with one arm on a given side being in alignment with a corresponding arm on the opposite side to form a pair of terminus-retaining arms, each arm having means for removably retaining a terminus therein, and
    (c) score line extending across substantially the entire width of said spine between respective pairs of said arms to permit removal of all but the required number of said pair of arms and the spine portion between them by breaking said clip along one of said score lines.

5. The spring clip of claim 4 characterized further in that each of said terminus retaining means comprises means defining a round recess between the prongs of said arm.

6. The spring clip of claim 5 characterized further in that each said arm includes a C-shaped region resiliently joining said arm to said spine.

7. The spring clip of claim 6 characterized further in that each said bifurcated arm includes a pair of prongs with facing chamfered corners and facing semicircular recesses, respectively for guiding and retaining one of said termini.

* * * * *

Notice of Adverse Decision in Interference

In Interference No. 101,975, involving Patent No. 4,588,257, J. J. Maranto, SEPARABLE SPLICE FOR OPTIC FIBERS, final judgment adverse to the patentee was rendered Nov. 15, 1988, as to claims 1 - 7.
[*Official Gazette February 14, 1989.*]